April 3, 1962     W. H. CROASDALE     3,027,697
ARTICLE PACKING APPARATUS
Filed Jan. 30, 1959     3 Sheets-Sheet 1

INVENTOR.
WILLIAM HERBERT CROASDALE
BY Leland R. McCann
George W. Reiber
ATTORNEYS April 3, 1962 — W. H. CROASDALE — 3,027,697
ARTICLE PACKING APPARATUS
Filed Jan. 30, 1959 — 3 Sheets-Sheet 2

INVENTOR.
WILLIAM HERBERT CROASDALE
BY Leland R. McCann
George W. Reiber
ATTORNEYS April 3, 1962   W. H. CROASDALE   3,027,697
ARTICLE PACKING APPARATUS
Filed Jan. 30, 1959                                              3 Sheets-Sheet 3
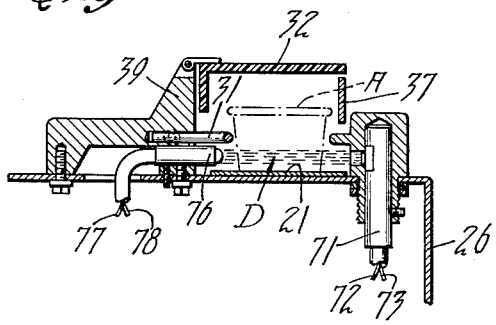
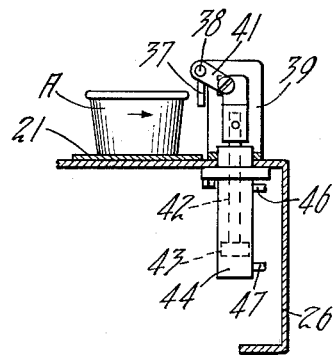
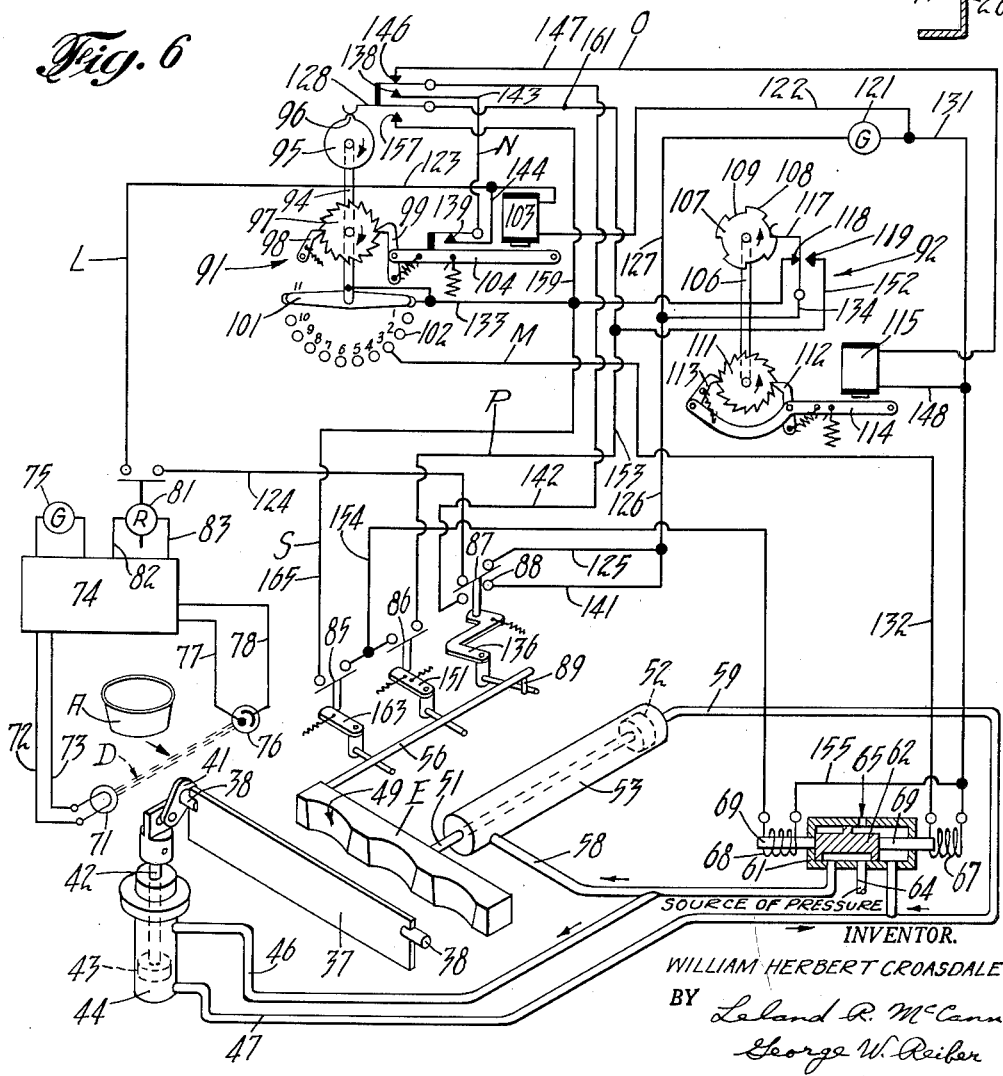
INVENTOR.
WILLIAM HERBERT CROASDALE
BY Leland R. McCann
George W. Reiber
ATTORNEYS

United States Patent Office 3,027,697
Patented Apr. 3, 1962

3,027,697
ARTICLE PACKING APPARATUS
William Herbert Croasdale, Stroudsburg, Pa., assignor to American Can Company, New York, N.Y., a corporation of New Jersey
Filed Jan. 30, 1959, Ser. No. 790,101
4 Claims. (Cl. 53—62)

The present invention relates to an apparatus for packing articles into cartons and the like and has particular reference to devices for arranging the articles into rows of a predetermined number of articles and for placing the rows of articles into a carton.

An object of the invention is to provide for the automatic packing into cartons of fragile or frail articles such as confections or fancy foodstuffs in light weight tapered cup containers or the like which in themselves, because of shape or frailty, are not adapted through physical contact to operate movable parts of a packing machine.

Another object is to provide for the effective packing of such articles at high speed and without damage to the articles.

Numerous other objects and advantages of the invention will be apparent as it is better understood from the following description, which, taken in connection with the accompanying drawings, discloses a preferred embodiment thereof.

Referring to the drawings.

Figure 1:
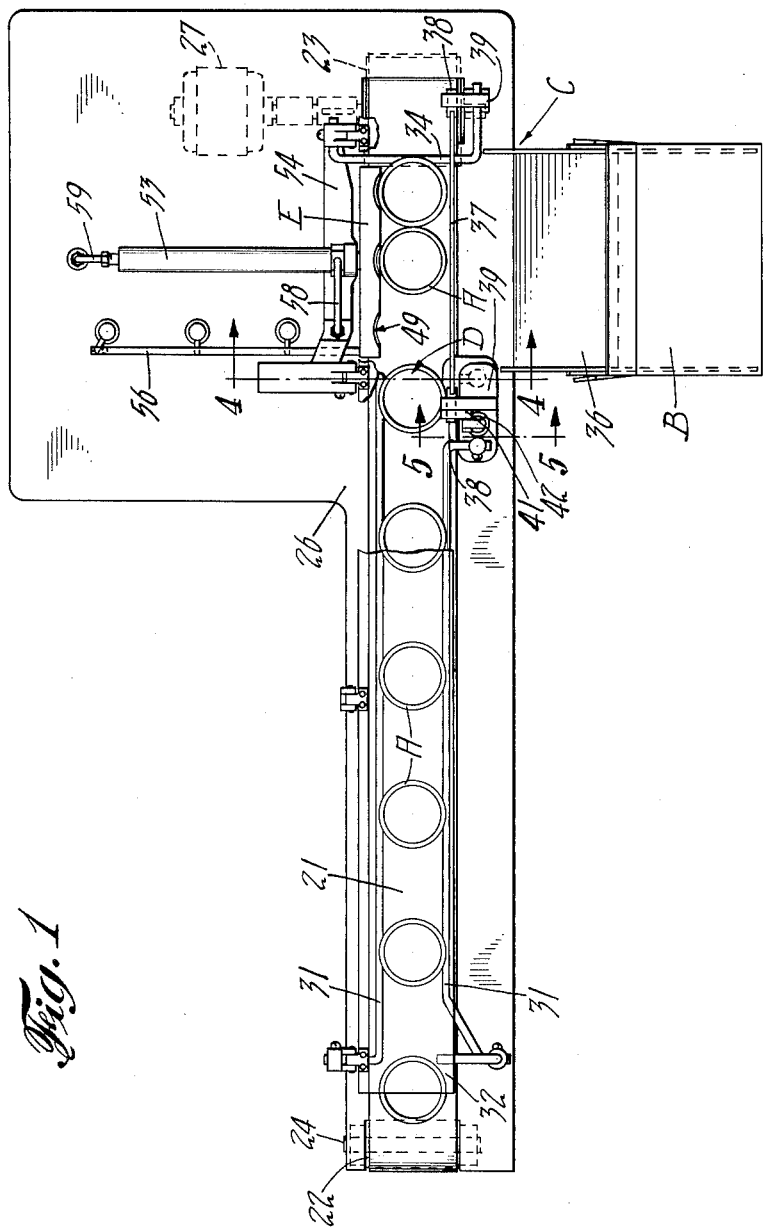
FIGURE 1 is a plane view of an article packing apparatus embodying the instant invention.
Figure 2:
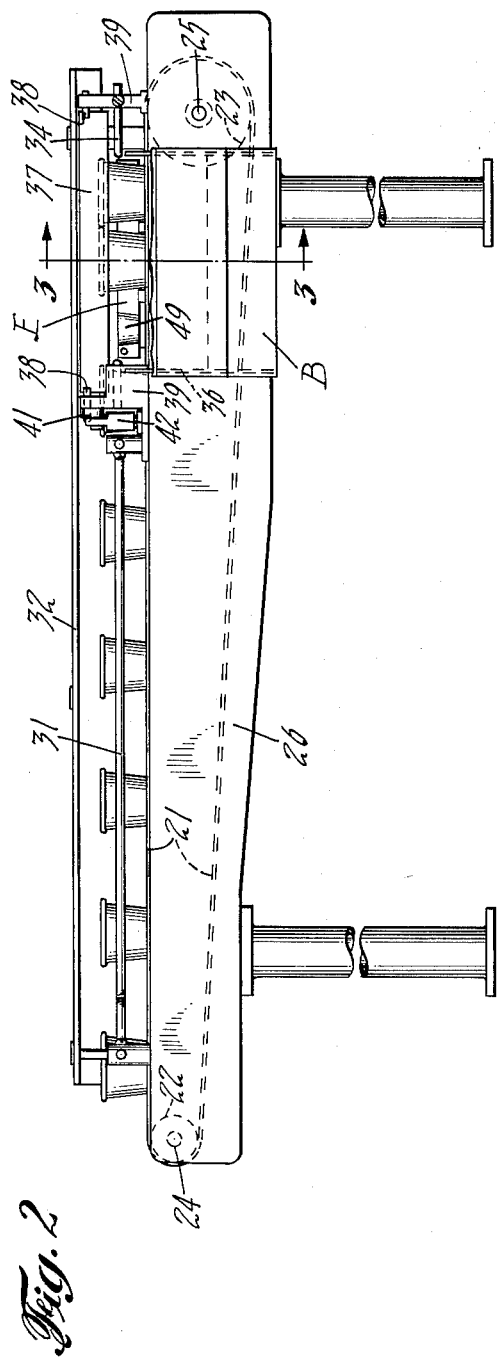
FIG. 2 is a side elevation of the apparatus shown in FIG. 1.

FIGS. 4 and 5 are enlarged sectional views taken substantially along the respective lines 4—4 and 5—5 in FIG. 1, with parts broken away; and FIG. 6 is a schematic view of principal parts of the apparatus and an electrical wiring diagram including electric devices associated with the parts of the apparatus.

As a preferred and exemplary embodiment of the instant invention, the drawings illustrate an automatic apparatus in which articles A (FIG. 1) such as light weight paper cups, with or without contents, are packed in orderly rows in cartons B. For the sake of simplicity, the apparatus shown packs two rows of three articles each in one carton, although the invention is equally well adapted to packing more than two rows and more or less articles in each row if desired.

Briefly, the articles A enter the apparatus from any suitable source of supply in a substantially continuous single line procession and in spaced order. At a packing station C, the advancing articles pass through a beam D of light (see also FIG. 4) and collect in contiguous relation into a single row of a predetermined number (in this case three) of articles disposed beyond the light beam and in front of a pusher E.

The interception of the light beam D by the passing articles actuates a counter, which upon registering a predetermined number of articles, actuates the pusher E through a predetermined stroke to push the assembled row of articles transversely out of and just beyond the path of travel of the incoming articles, into a position adjacent the waiting carton.

Upon retraction of the pusher E, the incoming articles form a second counted row of articles in front of the pusher and the counter repeats its operation of actuating the pusher to push this second row into place alongside the first row and to continue its movement through a longer stroke to push both rows into the carton B. It is understood that if more than two rows are desired to be packed, the counter can be adjusted to effect such an assembly of rows by a repetition of the short strokes of the pusher prior to the final longer stroke.

In this manner each carton B, as it is placed at the packing station C, preferably manually, receives its rows of articles rapidly and gently so as to effect the packing of the articles at high speed and without damage.

Referring more in detail to the drawings, the articles A enter the apparatus and are carried therethrough in spaced processional order, on a support, preferably the top run of an endless belt conveyor 21 (FIGS. 1, 2, 3, 4 and 5) which extends horizontally for substantially the full length of the apparatus. The belt 21 operates over a pair of spaced pulleys 22, 23 disposed adjacent the ends of the apparatus. These pulleys 22, 23 are mounted on respective shafts 24, 25 journaled in bearings formed in a frame 26 which constitutes the main frame of the apparatus. The shaft 25 preferably is the driving shaft and is rotated continuously in any suitable manner such as by an electric motor 27.

The articles A are guided while traveling with the belt conveyor 21, by a pair of spaced and parallel guide rails 31 disposed adjacent the path of travel of the articles. A transparent plastic cover 32 preferably is disposed over the path of travel of the articles on the conveyor 21 and is hingedly held in place so that it may be raised if desired to gain access to the articles.

Figure 3:
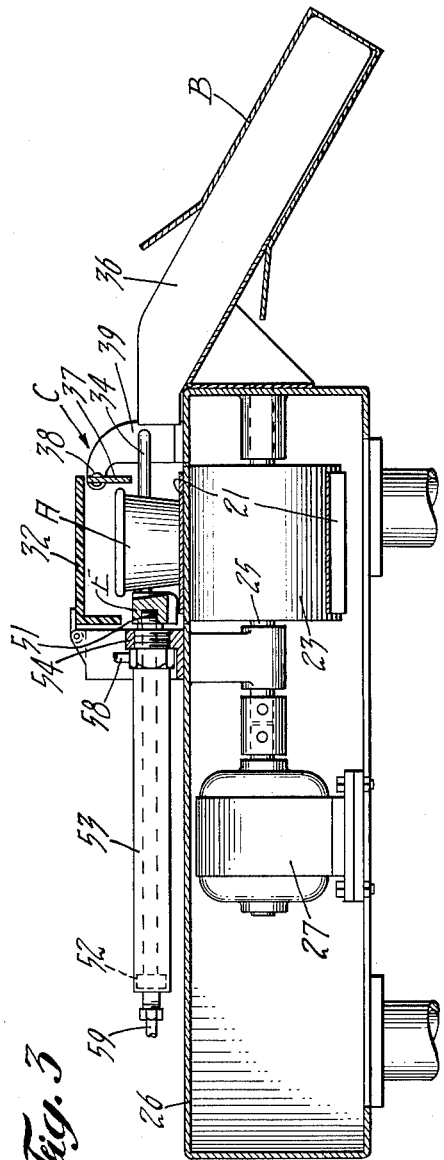
FIG. 3 is an enlarged transverse sectional view taken substantially along the line 3—3 in FIG. 2, with parts broken away.

At the packing station C, a stop bar 34 is disposed across the top run of the conveyor 21 in spaced relation thereabove to stop the travel of the articles and to thereby effect their collection or assembly in contiguous relation to form a unit row for packing into the carton B. The carton B, with one end open, as best shown in FIGS. 1 and 3, preferably is manually pushed over the outer end of an inclined trough 36 which extends at right angles to the belt conveyor 21 and which is mounted on the frame 26 at the packing station, with one edge (at the right as viewed in FIG. 1) aligned with the stop bar 34. Between the trough 36 and the belt conveyor 21, there is provided a hingeable gate 37 which is longitudinally aligned with the adjacent guide rail 31, and which forms a movable continuation of the rail.

The gate 37 at its ends is provided with horizontal trunnions 38 which are carried in brackets 39 attached to the top of the frame 26. One of the trunnions (at the left as viewed in FIGS. 1 and 2) carries a gate actuating arm 41 (see FIGS. 5 and 6) having its outer ends connected to a vertically disposed rod 42 of a piston 43 operating in a fluid pressure cylinder 44 attached to the frame 26. A fluid pressure medium is introduced into the cylinder 44 in time with the assembly of the rows of articles at the packing station C, by way of pipes 46, 47 (see also FIG. 6) connected to the ends of the cylinder and to a suitable source of the pressure medium to be hereinafter described, to hinge the gate 37 open at the proper time to permit movement of the row of assembled articles A out of the path of travel of the incoming articles as mentioned hereinbefore.

The pusher E which packs the assembled rows of articles A into the carton B, is disposed in horizontal relation alongside of the belt conveyor 21 directly opposite the gate 37 so that the incoming articles advance and are assembled into row formation between the pusher and the gate as shown in FIG. 1. The face of the pusher preferably is provided with shallow recesses 49 to accommodate the articles.

The pusher E preferably is mounted on one end of a rod 51 (see FIGS. 1, 3 and 6) carrying a piston 52 which operates in a fluid pressure cylinder 53 secured in a yoke bracket 54 attached to the top of the frame 26. A hold-back rod 56 attached to the pusher E extends back through the bracket 54 and serves as a guide to retain the pusher in a horizontal position and further serves as a stop to hold back the incoming articles on the conveyor 21 during the operation of the pusher across the conveyor.

Actuation of the pusher E is effected by a fluid pressure medium which is introduced into the ends of the cylinder 53 alternately, by way of pipes 58, 59 which connect with the ends of the cylinder and with the respective pipes 46, 47 of the gate actuating cylinder 44 (see FIG. 6). The pipes 58, 59 also connect with a slide valve casing 61 (FIG. 6) containing a slide valve 62 which normally provides communication between the pipe 58 and an inlet pipe 64 to maintain a fluid pressure on the pistons 43, 52 of the respective cylinders 44, 53 to retain the gate 37 in closed position and the pusher E in a retracted relation (as shown in FIG. 6) to permit the entrance of articles into the packing station C. In these normal positions of the gate 37 and the pusher E, the piston ends of the cylinders 44, 53 are vented to the outside atmosphere through a vent port 65 in the slide valve casing 61. The inlet or source pipe 64 leads to any suitable source of the fluid pressure medium, preferably compressed air.

In operation, the slide valve 62 is shifted from the normal position shown in FIG. 6, toward the right to actuate the pusher E through a pushing or working stroke and to open the gate 37, and then is shifted toward the left back into its normal position to retract the pusher E and to close the gate 37. This is effected by electric solenoids 67, 68 which surround suitable cores 69 attached to the ends of the slide valve 62 and projecting outside of the valve casing 61 as shown in FIG. 6.

When the articles A on the continuously moving conveyor 21 advance into the pushing station C, the first article in the procession engages against and is stopped in front of the pusher E, by the stop bar 34. The next article in line engages and is stopped by the first article, and so on, until a unit row of a predetermined number (in this case, three) of articles is formed.

When the last article A is added to the row, the slide valve 62 shifts toward the right (in FIG. 6) and thereby reverses the flow of the fluid medium, the valve cutting off communication between the source pipe 64 and the cylinder pipes 46, 58 and opening communication between the source pipe 64 and the cylinder pipes 47, 59. This permits the fluid pressure medium to flow into the piston ends of the cylinders 44, 53 and thereby effect the opening of the gate 37 and the forward movement of the pusher E.

The pusher E immediately engages and pushes the assembled line or row of articles A laterally off the belt conveyor 21 to a place of deposit just beyond the conveyor and in line with the waiting carton B. At the same time, the pusher draws the hold-back bar 56 across the conveyor 21 in front of the incoming articles and thereby holds them back until the completion of the pusher operation. This stroke of the pusher E is called a short stroke and upon its completion, the slide valve 62 is returned to its normal position and thus returns the flow of the fluid pressure medium to its original course to retract the pusher and close the gate behind the first row of articles for a repeat assembly of the second row of articles.

When the second, in this case the last row of articles is assembled, the slide valve 62 again actuates the pusher E and the gate 37. However, this stroke of the pusher is a long stroke, and it results in the pushing of the row of articles off the conveyor 21 and advancing it into engagement with the first row and then pushing both rows down the trough 36 into the waiting carton B. This assembly of the articles into rows of a predetermined number of articles and the operation of the pusher through short and long strokes is controlled by the light beam D hereinbefore mentioned.

The light beam D extends across the path of travel of the articles advancing into the packing station C on the belt conveyor 21 and is disposed adjacent the entering end of the station. The beam D is projected from a light source such as a lamp 71 (FIGS. 4 and 6) disposed adjacent one edge of the belt conveyor 21 and receiving electric current by way of wires 72, 73 connected into a commercial amplifying unit 74 supplied by a source of current such as a generator 75.

Adjacent the opposite edge of the belt conveyor 21, the light beam D is received in a photoelectric cell or eye 76 (FIGS. 4 and 6) connected by wires 77, 78 to the amplifying unit 74. The amplifier 74 through the electric eye 76 controls a normally open relay 81 connected thereto by wires 82, 83.

As each article passes into the packing station C it passes through and momentarily breaks the light beam D and this is utilized to control a memory device which counts the number of articles as they are assembled into row formation and which selects the length of the pusher stroke for each row. This is effected through a plurality of cooperating electric circuits, a set of four switches comprising a normally open long stroke switch 85 (FIG. 6), a normally open short stroke switch 86 and a combined double pole normally closed starting switch 87 and normally open circuit switch 88, all of which are controlled by a pin 89 attached to the hold-back bar 56, and a commercial self setting relay 91 and a commercial self reversing relay 92.

The self setting relay 91 is well known in telephone and other installations as a memory device and briefly comprises a rotatable shaft 94 having attached thereto an edge cam 95 having a high spot 96, an actuating ratchet wheel 97 having a spring held holding pawl 98 and an actuating pawl 99, and a double prong rheostat arm 101 adapted to be rotated across a series of eleven electric contacts 102 arranged in a semi-circle as shown in FIG. 6. In the instant invention each contact 102 represents one article counted as it enters the packing station C and as each article is counted the rheostat arm shifts to the proper contact. Since in the instant case three articles comprise a row, only the first three contacts 102 are utilized in the operation of the apparatus, and the other contacts 102 are rapidly traversed by self operation of the relay as will be hereinafter explained. Actuation of the rheostat arm 101 through the ratchet wheel 97 is effected through energization of a normally de-energized electro-magnet 103 disposed adjacent a pivoted spring held lever 104 which carries the actuating pawl 99.

The self reversing relay 92 similarly comprises a rotatable shaft 106 which carries castellated shaped edge cam 107 having alternating high and low spots 108, 109 and a ratchet wheel 111 which is rotated through double partial rotations by a pair of oppositely disposed actuating pawls 112, 113 carried on a pivoted spring-held lever 114 rocked by energization of a normally de-energized electro-magnet 115. The partial or stepped rotation of the ratchet wheel 111 similarly rotates the cam 107 and through this rotation shifts from a low spot to a high spot and vice versa, a movable switch element 117 which controls a normally closed switch 118 and an adjacent normally open switch 119 to control the selection of the short and the long pusher strokes hereinbefore mentioned.

In the operation of the various circuits and the self setting relay 91 and the self reversing relay 92, the breaking of the light beam D by the first article entering the packing station C closes the relay 81 and establishes a circuit L which includes a suitable source of electric current such as a generator 121, the normally de-energized magnet 103 of the self setting relay 91 and the normally closed starting switch 87. Closing of this circuit causes the electric current to flow from the generator 121 along a lead wire 122 to and through the magnet 103, a wire 123 to and through the closed relay 81, a wire 124 to and through the closed starting switch 87 and wires 125, 126, 127 returning to the generator 121. Current flowing along this circuit momentarily energizes the magnet 103 and this attracts the lever 104 and raises the pawl 99 to engage an advanced tooth of the ratchet wheel 97. Upon de-energization of the magnet 103 by reestablishment of the light beam D after the passing of the first article, the lever 104 is released and its spring pulls it down, thereby causing the ratchet wheel to rotate through a predetermined step and this rotates the rheostat arm 101 to the first contact 102 to register or memorize the passage of the first article into a row now being built up. This first partial rotation of the ratchet wheel 97 also partially rotates the cam 95 and shifts its high spot 96 to actuate a movable switch element 128 which prepares other circuits for subsequent use as will be hereinafter described.

This establishment of the circuit L to energize the memory device magnet 103 is repeated three times, once for each article A as it breaks the light beam D and enters the packing station C to be assembled into row formation. With the passage of the third article A, and thus the completion of the row, the rheostat arm 101 engages the third contact 102 and this sets up a new circuit M which provides for the shifting of the slide valve 62 to start the pusher E through a working stroke and to provide for the self setting of the memory device 91 for a repeat operation on the next row of articles.

In the circuit M, current from the generator 121 flows along a lead wire 131 to and through the slide valve solenoid 67, a wire 132 to the third contact of the rheostat, thence through the rheostat arm 101, a connecting wire 133 to and through the closed self reversing switch 118, and connecting wires 134, 127 returning to the generator 121. This flow of current energizes the solenoid 67 and, through its core 69, shifts the slide valve 62 toward the right thereby connecting the pipe 59 leading to the pusher cylinder 53 to the source of fluid pressure medium and this moves the pusher E forward through its working stroke as hereinbefore mentioned. This shifting of the slide valve 62 also opens the gate 37 as mentioned hereinbefore.

When the pusher E moves forward, it carries with it the hold-back bar 56. The forward movement of this bar takes the pin 89 away from a spring urged lever 136 which permits the lever to fall back and thereby open the starting switch 89 and close the normally open circuit switch 88. This latter action cuts out the circuit L to render it inoperative for an article A that may be interposed in the light beam D after the formation of a unit row and it also establishes a self setting circuit M which was previously partially established by the self setting relay cam 95 and which operates to permit the self-setting function of the relay 91.

The self setting operation is effected through a normally open switch 138 which is closed when the high spot 96 of the cam 95 releases the switch element 128 upon the breaking of the light beam D by the first article A of a row to be built up as hereinbefore mentioned. The self setting operation also is effected by a normally closed switch 139 which is opened every time the ratchet lever 104 raises upon energization of the magnet 103.

Hence with both switches 138, 139 closed, the closing of switch 88 by the movement of the pusher E, completes the self setting circuit N and current flows from the generator 121 along wire 127, 126, a connecting wire 141, to and through closed switch 88, a connecting wire 142, to and through the closed switch 138, a connecting wire 143, to and through the closed switch 139, a wire 144 to and through the magnet 103 and the wire 122, returning to the generator 121. Current flowing along the circuit N immediately energizes the magnet 103, which in turn raises the ratchet lever 104 which upon release as hereinbefore mentioned shifts the rheostat arm 101 to the number 4 contact. This immediately breaks the circuit M leading to the slide valve solenoid 67 to deenergize the solenoid and thus release the slide valve 62 for a subsequent shifting operation to be hereinafter described.

The raising of the rheostat lever 104 also opens the switch 139 and this breaks the self setting circuit N and thus effects deenergization of the magnet 103. The deenergized magnet 103 permits the ratchet lever 104 to fall and this again closes the switch 139. The self setting circuit N is thereupon re-closed and the magnet 103 is thus immediately reenergied and so raises the ratchet lever 104 again to shift the rheostat arm 101 to the next contact number 5. In this manner the self setting circuit N through repeated breakage and reestablishment twirls the rheostat arm 101 through its path of travel across all of the remaining not used contacts until it returns to its normal position as shown in FIG. 6 for a subsequent repeat cycle of operation when the next row of articles is built up. This is a conventional self setting relay well known in the art and its action is almost lightning fast so that its cycle of operation is completed almost instantly, the cycle being terminated by the high spot 96 of the cam 95 returning to its normal position as shown in FIG. 6, at which position it lifts the switch element 128 and thereby opens the switch 138 to hold the circuit N in a broken condition.

The closing of the switch 88 by the forward movement of the pusher E also establishes another circuit; a self reversing circuit O which actuates the self reversing relay 92 to control the length of the stroke of the pusher E. This circuit includes a switch 146 which is associated with the self setting cam 95 and which is closed only when the high spot 96 of the cam 95 is in its normal position as shown in FIG. 6.

When both switches 88 and 146 are closed, electric current from the generator 121 flows along wires 127, 126, 141 to and through closed switch 88, connecting wire 142 to and through the closed switch 146, a connecting wire 147 to and through the self-reversing relay magnet 114, and connecting wires 148, 131, returning to the generator 121. The establishment of this circuit O energizes the self reversing magnet 114 and this in turn lifts the ratchet lever 115 and causes the pawl 112 to turn the ratchet 111 through a partial rotation which in turn partially rotates the cam 107 in the same direction and the same angular distance.

The rotation of the self reversing cam 107 shifts the movable switch element 117 out of its cam recess or low spot 109 and positions it on top of the adjacent high spot 108. This action opens the switch 118 and closes the switch 119 to prepare a short stroke circuit P for operation. The high spots 108 on the cam 107 provide for the short strokes of the pusher E while the low spots 109 provide for the long stroke. In the instant case, these strokes are alternated because of the two row assembly to be packed in the cartons B. However for an assembly of more than two rows, repeated short strokes are required and this can be readily provided for by lengthening the high spots 108 circumferentially.

With the self reversing relay magnet 114 energized and the switch 119 closed, the pusher E continues to move forward until the row of articles A is completely removed from the conveyor 21. At this point in the cycle of operation of the apparatus, the pin 89 on the hold-back rod 56 contacts and shifts a spring urged lever 151 which momentarily closes the normally open switch 86. The closing of this switch 86 immediately closes the short stroke circuit P and hence current from the generator 121 flows along wires 127, 134 to and through the closed switch 119, connecting wires 152, 153 to and through the closed switch 86, a connecting wire 154 to and through the slide valve solenoid 68 and connecting wires 155, 131 returning to the generator 121.

Current flowing along this closed circuit P energizes the slide valve solenoid 68 and through its core 69, shifts the slide valve 62 back into its normal position as shown in FIG. 6. This shifting of the slide valve 62 cuts off communication between the fluid pressure source pipe 64 and the pipes 59, 47 of the respective cylinders 53, 44 and brings the pipes 58, 46 back into communication with the source pipe to return the pusher E to its original normal position and to close the gate 37 for a repeat row build up.

When the pusher E moves back, the switch 88 immediately reopens and when the pusher is fully back, the hold-back rod pin 89 engages the lever 136 and thus opens the switch 88 and closes the switch 87. Opening of the switch 88 breaks the circuit O and thereby deenergizes the self reversing relay magnet 114. This releases the ratchet lever 115 and permits it to fall. During this return travel the pawl 113 on the lever 115 partially rotates the ratchet wheel 111 and the cam 107 in the same direction as before. This is for mere mechanical advantage in design. The completion of this double step rotation leaves the switch element 117 on the high spot 108 of the cam 107 and thus keeps the switch 119 in an open condition.

The reclosing of the switch 87 resets the stage for the building up of the second row of articles A and thus returns the apparatus to a repeat establishment of the various circuits L, M, N, O, P in proper sequence to repeat the operations of building up the second row of articles and for operation of the pusher E through its forward stroke. These circuits are identical with the first row operation with the exception of circuit M which on the long stroke of the pusher E is different because of the open condition of switch 118 of the self reversing relay 92.

In establishing circuit M after the passage of the third article A into the row, when the rheostat arm 101 of the self setting relay 91 is on contact 3 as hereinbefore mentioned, the circuit is re-routed through the closed switch 119 and a normally open switch 157 which is closed by the cam 95 of the self setting relay 91 after passage of the first article into the row. Current then flows from the generator 121 along wire 131 to and through the slide valve solenoid 67, wire 132 to contact 3 of the self setting relay rheostat arm 101, wire 133, a connecting wire 159 to and through the closed switch 157, a connecting wire 161, wire 152 to and through closed switch 119, wires 134, 127 returning to the generator 121. This new or modified circuit M effects the energizing of the slide valve solenoid 67 to shift the slide valve 62 to effect the forward or working stroke of the pusher E for the second or last row to be packed into the carton B.

The forward stroke of the pusher E for this last row of articles again causes the opening of the switch 87 and the closing of the switch 88 to cut out the circuit L as before and to effect establishment of the circuits M, N and O for repeat operations. This second establishment of the circuit O and the resulting energization of the self reversing magnet 114 rotates the ratchet 111 and the cam 107 through another two step partial rotation and this time causes the switch element 117 to ride off the high spot 108 and to fall into the next adjacent recess or low spot 109. This action opens the switch 119 and closes the switch 118. The opening of switch 119 cuts out the circuit P and the switch 86 therein.

Thus, when the pusher E moves forward through its working stroke, the hold-back pin 89 upon contact with the switch 86, momentarily closes it but nothing happens since in this circuit the switch 119 is open. Hence the pusher E continues on beyond the switch 86 for a long stroke and only stops when the hold-back pin 89 engages and actuates a spring urged lever 163, which momentarily closes the long stroke switch 85. It is this long stroke of the pusher E that pushes the second row of articles into engagement with the first row and as it continues its forward movement to push both rows into the carton B.

The closing of the switch 85 reverses the movement of the pusher E and returns it to its original normal position. This is effected through a circuit S. When the switch 85 is closed, current from the generator 121 follows along wires 131, 155 to and through the slide valve solenoid 68, wire 154 to and through the closed switch 85, a connecting wire 165, to and along wire 133 to and through the closed switch 118, and wires 134, 127 returning to the generator 121. This flow of current energizes the slide valve solenoid 68 and thus returns the slide valve 62 to its normal position as shown in FIG. 6 to introduce the fluid pressure medium into the cylinders 53 and 44 to return the pusher E to its normal position for a repeat operation and to close the gate 37 behind it.

The return of the pusher E to its normal position opens the switch 85 and again opens the switch 88 and closes the switch 87, thus completing the full cycle of operation of the apparatus and resetting the circuit L for a repeat cycle of operation.

Thus, through the operation of the pusher E by means controlled by the light beam D and without physical contact of the articles, the articles are readily arranged into row formation and are pushed into the cartons B at high speed and without in any way damaging the articles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An article packing apparatus comprising means for feeding articles along a path of travel into row formation at a packing station, means for counting said articles as they are assembled into said row formation, a pusher disposed at said packing station adjacent the path of travel of said articles, a control element on said pusher, means for reciprocating said pusher transversely of the path of travel of said articles in selectively short and long strokes, and a memory device including a self-setting relay and a self-reversing relay operatively connected with said counting means and said control element through switch devices, said memory device being also operatively connected with said pusher reciprocating means for selecting the length of stroke of said pusher for each of said rows, whereby said pusher is reciprocated through a predetermined number of relatively short strokes to assemble a predetermined number of rows of said articles and a relatively long stroke for the last of said rows to push the entire assemblage of rows of articles into a container disposed in line with said pusher.

2. An article packing apparatus comprising means for feeding articles along a path of travel into row formation at a packing station, means for counting said articles fed to said packing station, pusher means disposed at said packing station adjacent the path of travel of said articles, means for reciprocating said pusher means transversely of the path of travel of said articles in short and long strokes, instrumentalities connected with said counting means and said pusher reciprocating means for controlling the actuation of said pusher and the length of the stroke of said pusher in accordance with the progressing number of articles counted by said counting means thereby to effect a predetermined number of short strokes to assemble a predetermined number of rows of said articles and to effect a long stroke for the last row to push the entire assemblage of rows of articles into a carton disposed in line with said pusher means, a gate at said packing station disposed opposite said pusher means and located adjacent the path of travel of the articles advancing into said station to guide said articles into row formation, and means to open said gate upon the formation of a row of said articles and in advance of the movement of said pusher means, thereby to prevent contact of said articles with said gate as they are moved by said pusher means transversely of said path of travel and past said gate.

3. An article packing apparatus comprising means for feeding articles along a path of travel into row formation at a packing station, means for counting said articles fed to said packing station, pusher means disposed at said packing station adjacent the path of travel of said articles, means for reciprocating said pusher means transversely of the path of travel of said articles in short and long strokes, and instrumentalities connected with said counting means and said pusher reciprocating means for controlling the actuation of said pusher and the length of the stroke of said pusher in accordance with the progressing number of articles counted by said counting means thereby to effect a predetermined number of short strokes to assemble a predetermined number of rows of said articles and to effect a long stroke for the last row to push the entire assemblage of rows of articles into a carton disposed in line with said pusher means, a gate at said packing station disposed opposite said pusher means and located adjacent the path of travel of the articles advancing into said station to guide said articles into row formation, and means connected with said pusher reciprocating means and controlled by said counting means to open said gate upon the formation of a row of said articles and in advance of the movement of said pusher means, thereby to prevent contact of said articles with said gate as they are moved by said pusher means transversely of said path of travel and past said gate.

4. An article packing apparatus comprising means for feeding articles along a path of travel into row formation at a packing station, a pusher disposed at said packing station adjacent the path of travel of said articles, a control element on said pusher means for reciprocating said pusher transversely of the path of travel of said articles, electrically responsive means for controlling the actuation of said reciprocating means, an electric counter for counting off a predetermined number of articles to comprise a row as said articles pass into said station, a photoelectric cell responsive to a beam of light projected across said path of travel of said articles at the entrance end of said station to actuate said counter as the articles individually pass said beam, and a self reversing relay electrically connected to said counter and to said electrically responsive pusher control means through circuits including a plurality of switches actuated by said control element on and movable with said pusher for actuating said pusher through a predetermined number of relatively short strokes to assemble a predetermined number of rows of said articles and a relatively long stroke for the last of said rows to push the entire assemblage of rows of articles into a carton disposed in line with said pusher.

References Cited in the file of this patent
UNITED STATES PATENTS

| | | |
|---|---|---|
| 660,086 | Camp | Oct. 16, 1900 |
| 2,574,196 | Solomon et al. | Nov. 6, 1951 |
| 2,613,021 | Bowes | Oct. 7, 1952 |
| 2,633,251 | Bruce | Mar. 31, 1953 |
| 2,782,577 | Beall | Feb. 26, 1957 |